(12) United States Patent
Desai et al.

(10) Patent No.: US 12,550,052 B2
(45) Date of Patent: Feb. 10, 2026

(54) ADAPTIVE PREFERRED SCAN CHANNELS IN WIRELESS NETWORKS

(71) Applicant: Cisco Technology, Inc., San Jose, CA (US)

(72) Inventors: Vishal S Desai, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 377 days.

(21) Appl. No.: 18/307,768

(22) Filed: Apr. 26, 2023

(65) Prior Publication Data

US 2024/0365213 A1    Oct. 31, 2024

(51) Int. Cl.
*H04W 48/16*    (2009.01)

(52) U.S. Cl.
CPC .................................. *H04W 48/16* (2013.01)

(58) Field of Classification Search
CPC .................................................... H04W 48/16
See application file for complete search history.

(56) References Cited

U.S. PATENT DOCUMENTS

| | | |
|---|---|---|
| 2014/0087727 A1 | 3/2014 | Walton |
| 2014/0286190 A1* | 9/2014 | Vallabhu ........... H04W 52/0274 370/254 |
| 2016/0295350 A1* | 10/2016 | Alanen ............... H04W 74/002 |
| 2018/0103404 A1* | 4/2018 | Emmanuel ............ H04B 1/005 |
| 2022/0272544 A1 | 8/2022 | Chitrakar et al. |
| 2022/0330136 A1 | 10/2022 | Siraj et al. |
| 2022/0338109 A1 | 10/2022 | Cherian et al. |
| 2023/0041365 A1 | 2/2023 | Gidvani et al. |
| 2024/0163731 A1* | 5/2024 | Mattaparti ............ H04W 28/20 |
| 2024/0314640 A1* | 9/2024 | Tanigawa .............. H04W 8/005 |

* cited by examiner

*Primary Examiner* — Kenneth T Lam
(74) *Attorney, Agent, or Firm* — Polsinelli P.C.

(57) ABSTRACT

Disclosed are systems, apparatuses, methods, and computer-readable media for adaptive preferred scan channels in wireless networks. A method includes: retrieving previous client device information connected to at least one access point (AP), analyzing the previous client device information for at least one property associated with wireless network usage of the at least one AP; and determining whether to configure preferred scan channels with additional channels based on the at least one property associated with the wireless network. Adding preferred scan channels to the default configuration can benefit wireless network performance.

20 Claims, 10 Drawing Sheets

ADAPTIVE PREFERRED SCAN CHANNELS IN WIRELESS NETWORKS

TECHNICAL FIELD

The disclosure relates generally to communication networks and, more specifically but not exclusively, to adaptive preferred scan channels in wireless networks.

DESCRIPTION OF THE RELATED TECHNOLOGY

Wireless systems employ processes to manage the radio resources of the wireless devices to optimize parameters including channelization, transmit power, etc. The management of the radio helps avoid or mitigate issues with signal interference, bandwidth contention, etc. Newer wireless local area network (LAN) standards increase frequency and bandwidth (e.g., up to 160 MHz) to obtain high data rates. Usage of wider bandwidths contributes to high-frequency reuse, which can cause more interference on at least some channels, among Basic Service Sets (BSSs) in a Radio Frequency (RF) neighborhood. Thus, the Access Points (APs) providing wireless access to the WLAN must carefully administer Radio Resource Management (RRM) to balance the higher bandwidth capacity and the increased interference potential (caused by overlapping spectrum) when selecting the higher bandwidths.

APs may rely on other communications technologies to connect to the rest of the network/Internet. One of the most common connections is an Ethernet switch, which may be directly connected to the AP. APs can also use other technologies as a backhaul, such as 5G networks or Data Over Cable Service Interface Specifications (DOCSIS). The realized capacity that the AP can provide to stations connected to the AP can be bottlenecked by the capacity of the switch and/or backhaul connection. For example, if the switch capacity is only 1 Gbps, then the stations connected to the AP cannot realize the full capacity of the 160 MHz bandwidth channels, which can support as much as 2.3 Gbps. Similarly, the 5G backhaul may have limited data rates, either from physical link capacity limits or from cellular service providers throttling the channel due to tiered plans.

With current RRM techniques, the switch and backhaul limits are not determined or allowed for in the bandwidth allocations, which can lead to wide bandwidth allocation to wireless stations and inefficient resource allocation.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
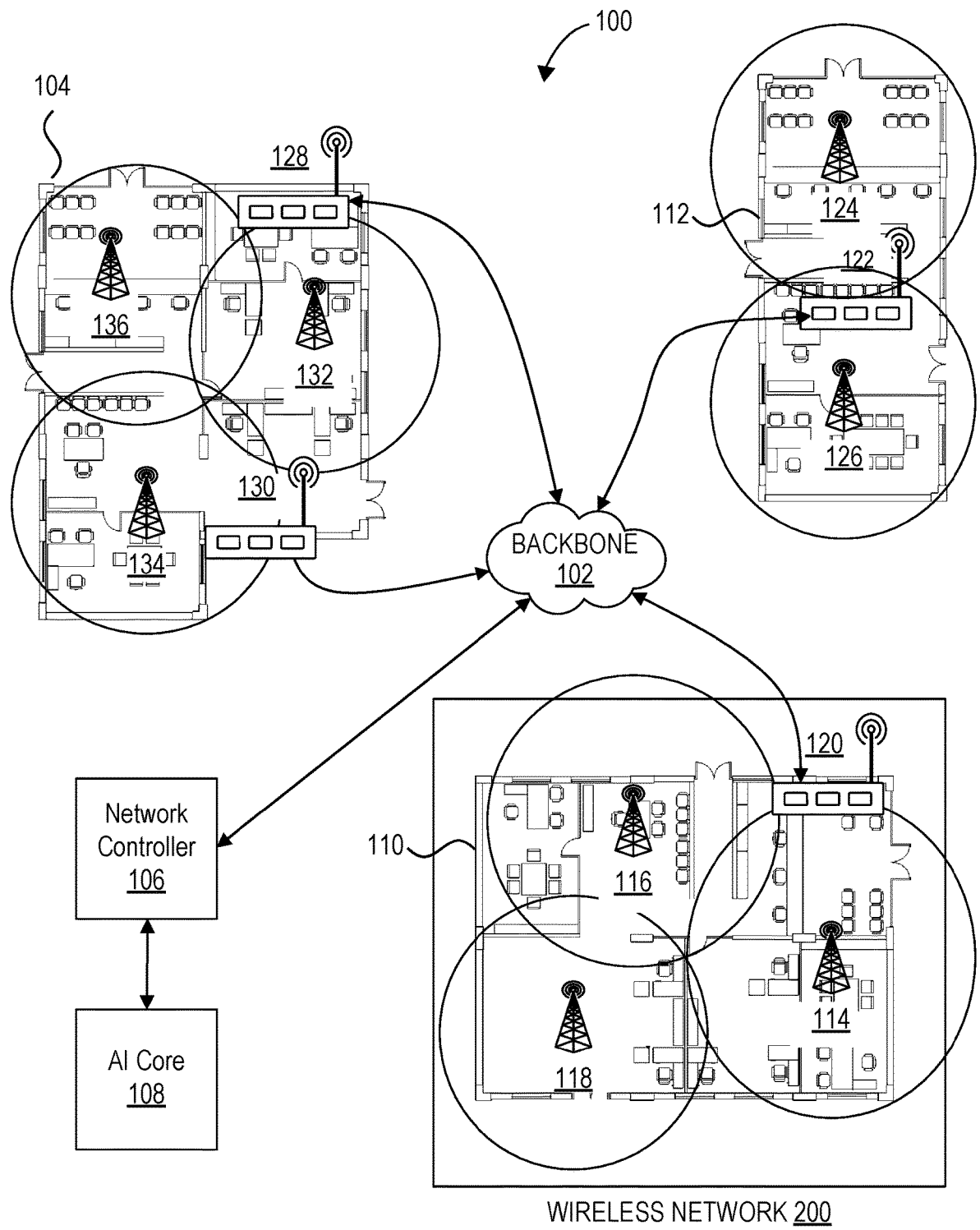
FIG. 1 is a conceptual diagram illustrating a wireless networking environment in accordance with some aspects of the disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, apparatuses, methods, computer-readable medium, and circuits for configuring preferred scan channels in a wireless network. According to at least one example, a method includes: retrieving previous client device information connected to at least one access point (AP); analyzing the previous client device information for at least one property associated with wireless network usage of the at least one AP; and determining whether to configure preferred scan channels with additional channels based on the at least one property associated with the wireless network. For example, the apparatus retrieves previous client device information connected to at least one access point (AP); analyzes the previous client device information for at least one property associated with wireless network usage of the at least one AP; and determines whether to configure preferred scan channels with additional channels based on the at least one property associated with the wireless network.

In another example, an apparatus for configuring preferred scan channels in a wireless network is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the apparatus to: retrieve previous client device information connected to at least one access point (AP); analyze the previous client device information for at least one property associated with wireless network usage of the at least one AP; and determine whether to configure preferred scan channels with additional channels based on the at least one property associated with the wireless network.

Example Embodiments

The following description is directed to certain implementations for the purposes of describing innovative aspects of various embodiments. However, a person having ordinary skill in the art will readily recognize that the teachings herein can be applied in a multitude of different ways. The described implementations can be implemented in any device, system, or network that is capable of transmitting and receiving radio frequency (RF) signals according to any communication standard, such as any of the Institute of Electrical and Electronics Engineers (IEEE) IEEE 802.11 standards (including those identified as WiFi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

Examples are described herein in the context of systems and methods for location estimation based on broadcast and detection of broadcast by adjacent, coordinating devices. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

Higher frequency bands (e.g., 6 GHZ) may have a larger bandwidth and scanning the entire frequency band would be inefficient. A preferred scan channel (PSC) is a mechanism used by wireless network devices to optimize the channel selection process during the initial network setup or roaming. For example, PSCs are prioritized when an STA first checks the availability and quality of these channels before moving on to scan other channels. PSCs reduce the time and resources required to scan the available channels, which can improve the overall performance and efficiency of the WLAN network and reduce the time for the STA to identify a channel for connecting to an AP.

The conventional design of AP and STAs provide may be based on assumptions. For example, an AP assumes that an STA will automatically reselect to a different AP once a received signal strength falls below a threshold. In reality, the APs and STAs try to enforce different rules. For example, APs attempt to enforce higher-quality connections by reselecting to other APs with higher quality signals and STAs attempt to maintain connections to prevent delays, reconnection, and reordering of packets that can happen when reselecting. That is, APs try to encourage reselection and STAs try to prevent reselection. For example, if an STA is in a region with overlapping coverage of two APs, the STA may attempt to maintain the connection to the lower quality connection.

In some cases, adding additional PSCs may benefit the performance of the wireless network to improve AP and STA performance. For example, adding additional channels can be beneficial for contemporary devices that support the 6 GHz band. However, adding PSC channels can affect legacy devices. A balanced approach to adding more PSCs may be beneficial to improve wireless networks.

In some aspects, a wireless controller may be configured to use machine learning (ML) techniques to improve channel selection based on providing bias to PSCs by adding channels for STAs. The wireless controller may use information associated with network operation to identify parameters to maximize performance. In one aspect, the wireless controller may receive information pertaining to PSCs and may add biasing to PSCs by dedicating additional channels as PSCs, which the STAs can scan.

FIG. 1 illustrates an example of a system network 100 that includes three buildings (i.e., building A 104, building B 110, and building C 112). In this non-limiting example, the building A 104 includes two wireless LAN controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. The building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via a control and provisioning of wireless access points (CAPWAP) protocol.

The settings of the WLCs can be controlled by a network controller 106, which communicates with the WLCs via the backbone 102. For example, the network controller 106 can be a CISCO DNA center, which is a centralized intent-based network management system. The network controller 106 can be based in the cloud, for example. Further, an artificial intelligence (AI) core 108 communicates signals to and from the network controller 106. The AI Core 108 can, e.g., signal configuration recommendations, and then some or all of the configuration recommendations can be implemented by the network controller 106, which signals network settings and configurations to the WLCs. The WLCs then apply the configurations and settings to the APs.

For example, the AI Core 108 can receive information such as telemetry data collected on the wireless network 200, and the AI Core 108 processes the received information to generate configuration recommendations for the wireless network 200. The received information may include information related to transmission, reception, interference, exceptions, mitigation events, and so forth. In some aspects, the APs may also collect telemetry information from each other and may communicate using a neighbor discovery protocol (NDP). The AI Core 108 may be, for example, a cloud-based application that learns from the wireless network 200 and from additional wireless networks how best to optimize the network configurations based on data and measured values from the respective networks. The configuration recommendations are then sent from the AI Core 108 to the network controller 106.

The wireless network 200 includes an artificial intelligence (AI) Core 102, a network controller 104, a wireless local area network (LAN) Controller 106, and several access points (APs) (e.g., AP1 116, AP2 114, and AP3 118). Each AP has a surrounding cell in which user devices, such as user equipment 1 (UE1) 202 and user equipment 2 (UE2) 204 can wirelessly communicate with the respective AP of the cell (e.g., cell1 206 surrounds AP1 116; cell2 208 surrounds AP2 114; cell3 210 surrounds AP3 118). In some cases, such as 802.11 standards, a user device may be referred to as a wireless station STA. As the user device moves from one cell to the next, the user device will change which cell it is communicating with. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications of the network administrator (or other uses).

The wireless LAN controller 120 can communicate with a wide area network (WAN) 206 to allow the user devices to access the internet, for example. The wireless network 200 can be a wireless LAN (e.g., Wi-Fi) operating in accordance with an IEEE 802.11 protocol.

The AI Core 108 can be used to perform radio resource management (RRM). RRM allows the wireless network 200 to continuously analyze the existing RF environment, and automatically adjust each APs' power and channel configurations to mitigate interference (e.g., adjacent channel interference, co-channel interference, electromagnetic interference, etc.) and signal coverage problems. RRM can reduce the need to perform exhaustive site surveys, and can increase system capacity and provides automated self-healing functionality to compensate for RF dead zones and AP failures. RRM includes several algorithms, which together provide management of the wireless network 200 and are further described in FIG. 3.

Figure 2:
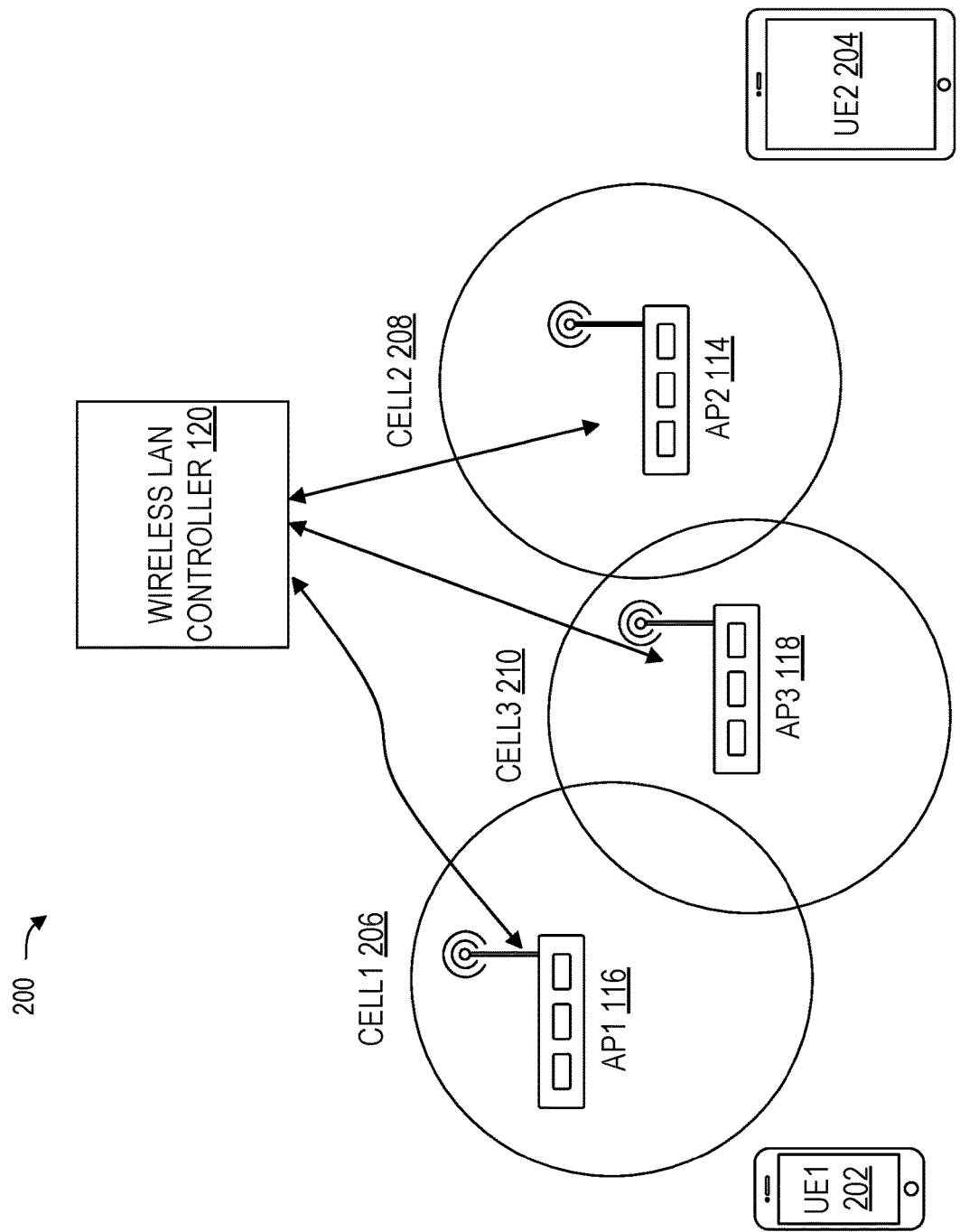
FIG. 2 is a conceptual diagram of an artificial intelligence (AI) core that can be used in a wireless networking environment in accordance with various aspects of the disclosure.
Figure 3:
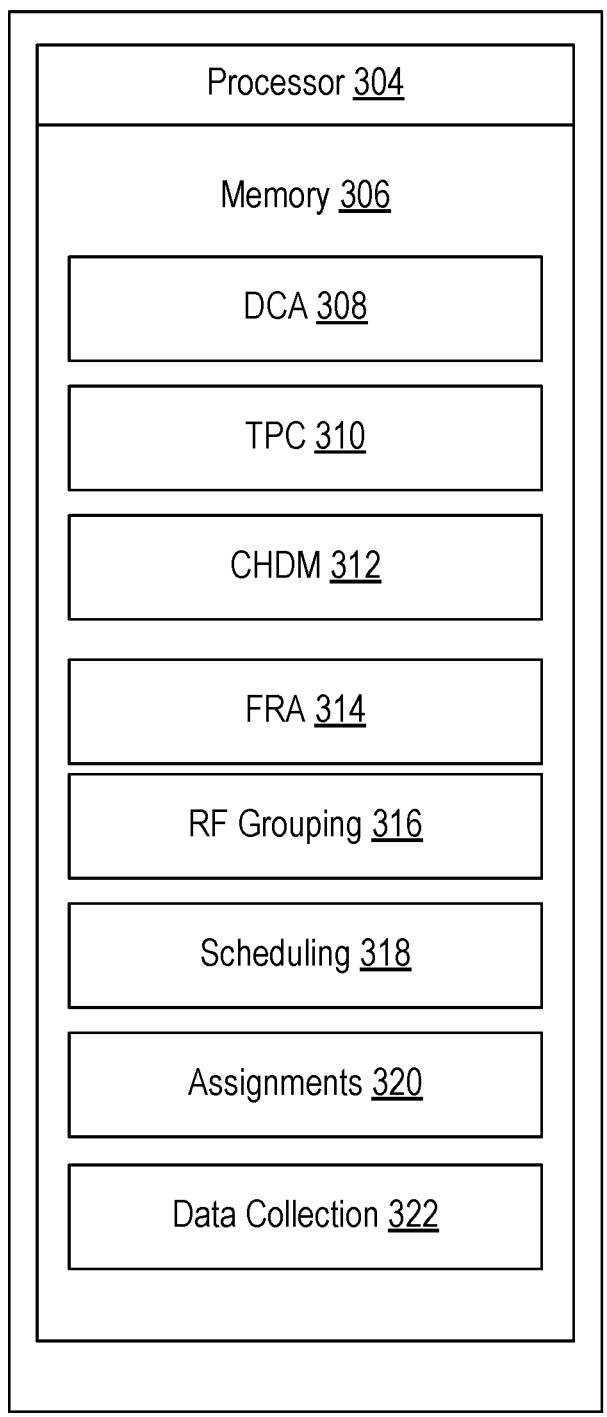
FIG. 3 illustrates a computing device that performs various radio resource management (RRM) functions, in accordance with aspects of the disclosure.

FIG. 3 illustrates a computing device 302 that performs various RRM functions, in accordance with aspects of the disclosure. Computing device 302 can be performed using distributed computing. Some or all of the functions of computing device 302 can be performed by the WLCs and some or all of the functions may be performed by the network controller 106 and/or the AI Core 108. In some examples, the computing device 302 can be an embodiment of the AI Core 108, illustrated in FIG. 2. In some embodiments, the functions attributed to computing device 302 may reside across the AI Core 108, network controller 106, and other devices illustrated in wireless network 200. The computing device 302 includes a processor 304 that performs the steps of the respective methods when executing the respective methods stored in the memory 306. The methods stored in the memory 306 can include, for example: (i) RF Grouping 316 (e.g., an algorithm responsible for determining the RF Group Leader and members); (ii) Flexible Radio Assignment (FRA) 314 (e.g., an algorithm charged with identifying redundant radios resources and re-assigning the resource to a better role); (iii) Dynamic Channel Assignment (DCA) 308 (e.g., a global algorithm that runs on the RF Group leader); (iv) Transmit Power Control (TPC) 310 (e.g., a global algorithm that runs on the RF Group Leader; and (v) Coverage Hole Detection and Mitigation (CHDM) 312 (e.g., a local algorithm that runs on each individual controller). The respective methods help to maintain optimal performance by optimally applying resources to balance various countervailing interests.

For example, increasing the transmit power in a cell (e.g., cell1 206 of an AP1 116) may help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of the available spectrum, the management traffic also increases, which also takes up a part of the channel capacity. The result is higher consumption of airtime and less throughput. This is commonly known as co-channel interference. Assuming that all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, thereby avoiding interference in overlapping regions between cells.

The use of RRM has several advantages including several features which manage specific traffic types or client types which can greatly increase the spectral efficiency and assist RRM in providing a better experience for users. The RRM can be organized according to a hierarchy with an RF Group Name at the top level, then RF Group leader(s) at the next level, which is then followed by RF Neighborhood(s) at the lower level, For any RF Group Name, multiple RF group Leaders may exist (e.g., one or more RF group Leaders frequencies in the 2.4 GHz band and one or more RF group Leaders frequencies in the 5 GHz band). An RF Group Leader can manage multiple RF Neighborhoods.

The RF grouping 316 method is used as the basis for the administrative management domain and the physical management domain within the RF Network. Regarding the administrative domain, proper function of the RRM is based on knowing which APs and controllers are under administrative control for each part of the network. For example, the RF Group name can be an identifier that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and measure their RF Proximity. This information can then be used to form RF Neighborhoods within the RF Group (e.g., a group of APs that belong to the same RF Group that can physically hear one another's neighbor messages above −80 dBm, for example). Each RF Group has at least one RF Group Leader per frequency band (e.g., 2.4 GHz, 5 GHZ, 6 GHZ). The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel on an interval (e.g., every 60 seconds or less). The NDP packet is a broadcast message that APs listen for and allows the AP to understand how every radio on every channel hears every other radio. The NDP packet also provides the actual RF path loss between APs. When an AP receives an NDP message, the AP validates whether the message is from a member of its RF Group. If the NDP message is valid, the AP forwards the message along with the received channel and RSSI to the controller. The forwarded message is added to the neighbor database, which in turn is forwarded to the RF group leader periodically. For each AP, each radio can store up to a predefined number of neighbors ordered by RSSI high to low. Post-processing of the RSSI information can be used to generate measurements for RX Neighbors (e.g., how the given AP hears other APs) and TX Neighbors (e.g., how other APs hear the given AP).

The FRA 314 uses the NDP messages to locate each radio based on RF distance and evaluate overlapping coverage by cell. Now, the flexible radio assignment 314 method is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the AP's coverage intersections. Based on this understanding, FRA uses a multipoint analysis, to determine the percentage of overlapping coverage for each evaluated AP. The output of this calculation is the COF (Coverage Overlap Factor %). Coverage Overlap Factor is the percentage of the analyzed cell that is covered at −67 dBm or higher by other radios in service. In the process of calculating this coverage, the FRA method 314 keeps track of radios that are coverage contributors to other radios COF, and the FRA method 314 prevents those radios to be marked redundant as long as a radio they are a contributor for is marked redundant.

Once a radio is marked redundant, the next step depends on the radio configuration. For example, there can be two (or more) operational states to which the flexible radio can be assigned: (i) FRA-auto or (ii) manual. When the radios are in the FRA Auto state, FRA looks to DCA to decide what to do with the now redundant radio(s). DCA's priorities are, first, to try to assign the redundant radio in 5 GHZ and increase capacity, but, if the DCA determines that there is already maximum 5 GHz coverage, the radio will be assigned to a monitor role instead.

In some examples, the DCA 308 monitors the available channels for the RF group and tracks the changing conditions. The DCA then optimizes the RF separation between APs (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted SNIR (Signal to Noise Interference Ratio). The Group Leader can maintain the neighbor lists for all APs in the RF Group and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel—rogue (e.g., other non-RF Group AP's operating on or overlapping with the AP's served channel); (iii) noise (e.g., sources of interference such as Bluetooth, analog video, or cordless phones); (iv) channel load (e.g., through the use of industry standard QBSS measurements— these metrics are gathered from the physical PHY layer and are similar to CAC load measurements); and (v) DCA sensitivity (e.g., a sensitivity threshold selectable by the user that applies hysteresis to the evaluation on channel changes). The impact of each of these factors can be combined to form a single RSSI-based metric known as the Cost Metric (CM). The CM then represents complex signal-to-noise and interference ratio (SNIR) of a specific channel, which is used to evaluate the throughput potential of one channel over another. The goal is to be able to select the best channel for a given AP/Radio that minimizes interference.

The transmit power control 210 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the required coverage level indicated by the TPC Threshold. TPC runs on the RF Group leader and is a global algorithm that can be sub-configured in RF profiles for groups of APs in an AP group.

According to examples of the disclosure, the CHDM 312 can be used to achieve the following objectives: (i) detect coverage holes, (ii) validate the coverage holes, and (iii) mitigate the coverage holes. That is, CHDM 312 first detects and mitigates coverage holes (if possible, without creating other problems) by increasing the transmit power and therefore cell area. According to certain non-limiting examples, CHDM can be a local algorithm that runs independently of RRM and the RF Group leader. To facilitate making decisions at a local level, CHDM can run on every controller. That is, each controller performs coverage hole detection monitoring all associated APs and thus monitoring every attached client and their received signal levels. Mitigation involves increasing the power of an AP, or group of APs to improve coverage levels to a certain area where client signals fall below a customer-selectable threshold.

According to certain non-limiting examples, coverage hole detection can be based on a 5-second (CHD measurement period) histogram of each client's RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process performed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify and power will again be increased by 1 step. This incremental approach can prevent wild and unstable swings in power.

Coverage hole mitigation, while operating independently of DCA and TPC, can have a significant effect on surrounding APs and the balance of the RF in an environment. Part of the decision to mitigate is based on an evaluation of whether the mitigation could be successful. Increasing the power of a given AP independently of the RF Group metrics is likely to negatively impact surrounding APs and mitigation should be applied judiciously. The combination of the new detection metrics and the power limits included in mitigation make CHDM a stable and predictable.

In addition to the above methods, the memory 306 of the computing device 302 can also store information for scheduling 318, assignments 320, and information for data collection 322. The data collection 322 can include several types of measurements.

With respect to data collection 322, the RRM processes collected data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can be used to detect rogue devices, and collect noise and interference metrics. Also, a Neighbor Discovery Protocol Transmission (TX) can be used to send the NDP message from all channels defined to be part of a monitor set.

Figure 4:
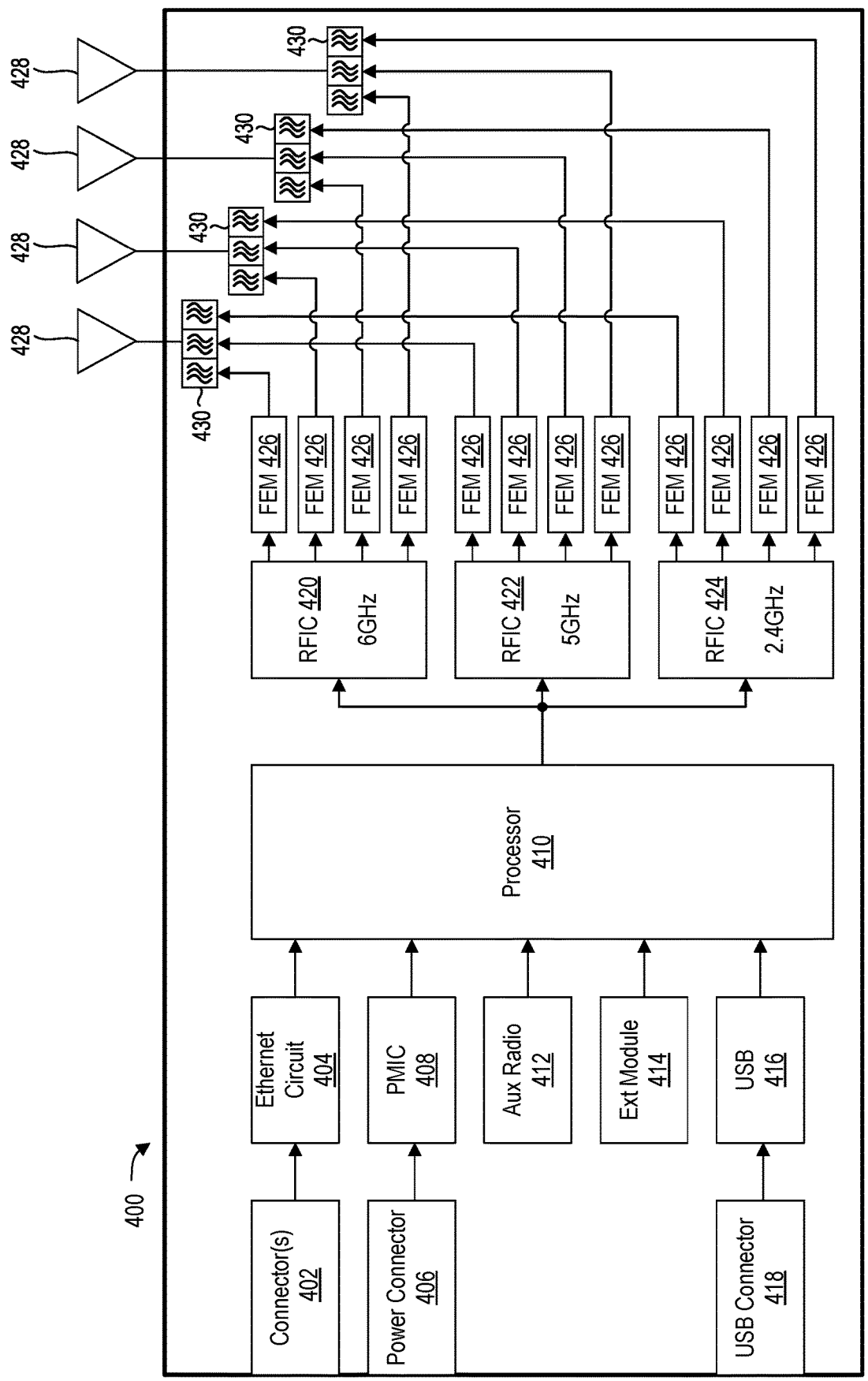
FIG. 4 a block diagram of an access point (AP) configured to bias preferred scan channels (PSCs), in accordance with aspects of the disclosure.

FIG. 4 a block diagram of an AP configured to bias preferred scan channels, in accordance with aspects of the disclosure. The AP 400 includes at least connector 402 (e.g., RJ45 Ethernet connector, MagJack, wired connector port, etc.) for receiving an Ethernet cable coupled to the connector. In some aspects, the AP includes a plurality of connectors for downstream devices (e.g., for local area networking (LAN) and at least one connector for upstream devices (e.g., for a wide area network (WAN)). In one aspect, the AP 400 can include a coaxial port and a data over cable service interface specification (DOCSIS) for connecting to an internet service provider (ISP). The AP 400 may operate in different modes as described below. The connector 402 is coupled to an Ethernet circuit 404 for sending and receiving signals over a physical media (e.g., an RJ45 cable). In this example, the Ethernet circuit 404 is connected to a processor 410 and provides data to the processor 410, which controls operation of the AP 400.

The AP 400 includes a power connector 406 that is configured to receive power from an external source, which is provided to a power management integrated circuit (PMIC) 408. The PMIC 408 is configured to control power conversion for the AP 400, such as converting AC to DC, stepping down the DC voltage to different DC voltages based on various circuits in the AP 400, and so forth. For example, the processor 410 may use two different voltages based on its operation state and may include a low voltage state in which limited processing occurs to conserve power.

The DC power from the PMIC 408 is provided to one or more AP functions. Non-limiting examples of AP functions include auxiliary connections (e.g., Bluetooth), storage functions, location detection, and so forth. For example, the PMIC 408 may provide power to an auxiliary radio 412 for various functions such as Bluetooth, Internet of Things (IoT) functions, etc. The AP 400 also includes external module 414 that connects to the processor 400 with a peripheral component interconnect express (PCIe) interface, a USB module 416 for interfacing with devices that are connected to the AP 400 via a USB connector 418 (e.g., a printer, an external storage medium), or any other AP function. The non-limiting AP functions and interfaces are examples, and the AP 400 can include additional functions, circuits, and features.

In some aspects, the processor 400 (e.g., a silicon on chip (SOC)) may be connected to radio frequency integrated circuits (RFICs) 420, 422, and 424 for communication (e.g., transmission and reception) with external devices, such as other APs and wireless stations (STAs). In one illustrative aspect, the processor 410 may generate data for transmitting and provide the data to the RFICs 420, 422, and 424 for transmissions on a respective carrier frequency. For example, RFIC 420 is configured to generate a signal in the 6 GHz frequency band, RFIC 422 is configured to generate a signal in the 5 GHz frequency band, and RFIC 424 is configured to generate a signal in the 2.4 GHz frequency band.

Each RFIC includes at least one front-end module (FEM) 426 that integrates multiple devices used to implement the RF front end, including, for example, a power amplifier, low noise amplifier, a mixer, or other components. In this example, the AP 400 includes four antennas 428, with each antenna 428 being connected to a triplexer 430 receiving input from three corresponding FEMs 426. For example, each triplexer 430 is coupled to a corresponding FEM of each RFIC 420, 422, and 426 and connects a corresponding antenna 428 to a corresponding RFIC. The AP 400 is configured to provide data to at least one RFIC 420, 422, and 424 to generate a signal for transmission by a corresponding antenna 428. The AP 400 is also configured to control the RFICs 420, 422, and 424 to receive signals from the antenna 428 and process the signals in the corresponding. In some aspects, each triplexer 430 is configured to connect the corresponding RFIC to an antenna 428.

Although the AP 400 in FIG. 4 is illustrated as a separate device, the AP 400 may be configured to be integral to other components, such as a mobile device or network component that is mounted to a rack.

Figure 5:
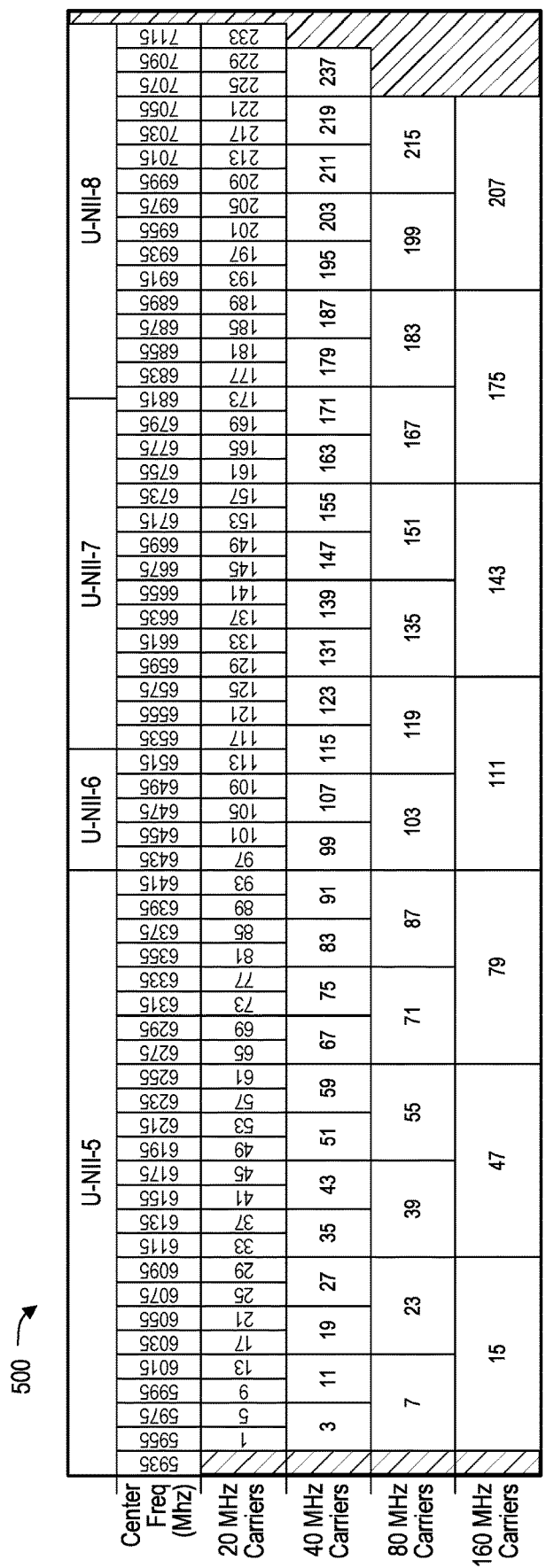
FIG. 5 is a chart 500 that illustrates channel and bandwidth allocation within a frequency band, in accordance with some examples of the disclosure.

FIG. 5 is a chart 500 that illustrates channel and bandwidth allocation within a frequency band, in accordance with some examples of the disclosure. The chart 500 illustrates the unlicensed national information infrastructure (U-NII) frequency bands 5 through 8 in the 6 GHz frequency band for IEEE 801.11 standards. As illustrated, the 6 GHZ bands can be configured into 20 MHZ, 40 MHZ, 80 MHZ, and 160 MHz carriers, with frequencies starting at 5.955 GHZ (e.g., 5955 MHz) and extending to 7.115 GHz (e.g., 7115 MHz). Scanning each of these carriers would consume a significant time and power because the STA needs to wait for each beacon, analyze the beacon during a dwell time (e.g., 100 ms), and so forth. PSCs are configured to reduce the number of channels that an STA scans, which in turn reduces the time to set up a connection and power consumed during connection setup. For example, an STA scanning all 59 of the channels and waiting 100 ms of dwell time per channel would consume 5.9 seconds to analyze all channels and would consume significant power.

The chart 500 also illustrates the various sub-bands in the unlicensed spectrum that are divided based on incumbent infrastructure and vary based on country. For example, all U-NII sub-bands were used by fixed satellite providers, and the U-NII-6 and U-NII-8 sub-bands may also include used broadcast auxiliary services and cable television relay services. In some cases, automatic frequency coordination (AFC) and power limitations are imposed to devices within the 6 GHz unlicensed spectrum. For example, low power indoor APs are permitted a maximum power spectral density (PSD of −1 dB per milliwatt (dBm) per 1 MHz of bandwidth.

In some cases, different sub-bands and channels within those bands may be more available than others. For example, an entire sub-band may be unavailable for the WLAN because portions of the WLAN are proximate to a fixed microwave unlink or broadcast services in the U-NII-6 sub-band.

Figure 6:
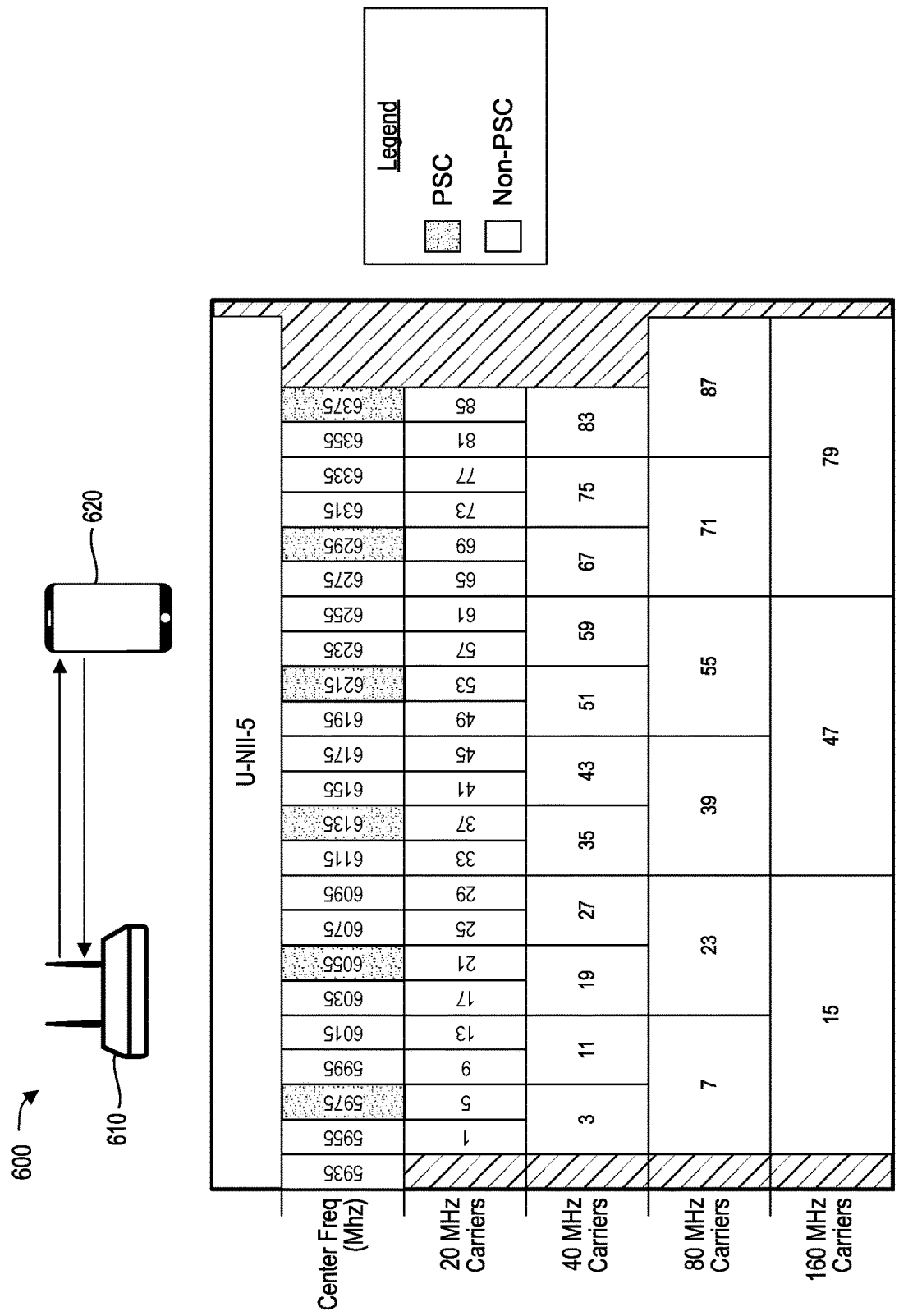
FIG. 6 is a conceptual diagram of a wireless local area network (LAN) transmitting PSCs in the U-NII-5 frequency band, in accordance with some examples of the disclosure.

FIG. 6 is a conceptual diagram of a wireless LAN 600 transmitting PSCs in the U-NII-5 frequency band, in accordance with some examples of the disclosure. The wireless LAN 600 includes an AP 610 and an STA 620 that connects to the AP 610 and receives network services. Conventional PSCs are interleaved every 4 channels to allow faster scanning of the entire band without touching each individual channel. In this case, the AP 610 is configured for transmitting beacons on the PSC on channel 69 (e.g., 6.295 GHZ). Because the AP 610 has a limited number of radios (e.g., 4 FEM as shown in FIG. 4), the AP 610 may only be limited to 1 PSC channel. When the STA 620 enters an area associated with the AP 610, the STA 620 sequentially scans channels 5, 21, 37, 53, 69 and 85 for beacons and identifies the AP 610 on channel 69. After scanning all PSCs, the STA 620 connects to the AP 610 based on the properties associated with channel 69 (e.g., highest received signal strength). In some aspects, the STA 620 can connect to the AP 610 on a non-PSC channel after detecting the AP 610 via the PSC on channel 69.

Although the PSC reduces the amount of time and power consumed, scanning each PSC channel is a blind, time-consuming process, particularly if the geographical area associated with the AP 610 is fully managed by a limited number of providers. For example, the AP 610 may be associated with a campus that includes a plurality of buildings, and the physical interface of network APs is limited to the entity associated with the campus (e.g., a business entity, an educational entity, etc.). And in some cases, entire sub-bands may be unavailable and can limit the available PSC channels.

Figure 7:
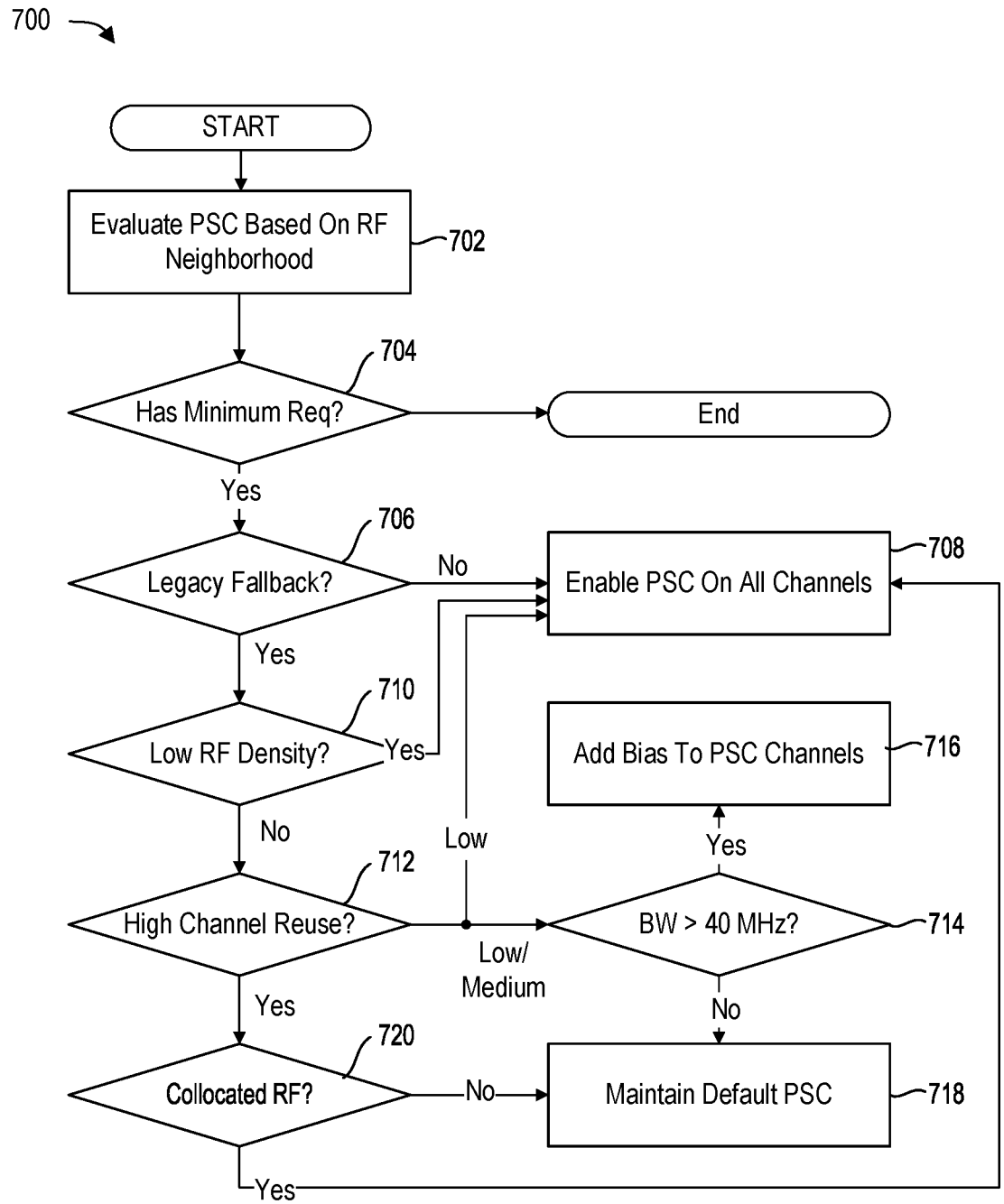
FIG. 7 is a flowchart illustrating an example of biasing PSCs to improve wireless connectivity in accordance with some aspects of the disclosure.

FIG. 7 is a flowchart illustrating an example method 700 of biasing PSCs to improve wireless connectivity in accordance with some aspects of the disclosure. In one illustrative aspect, the method 700 is performed by a network controller (e.g., the WLC 128) to identify additional PSCs that an AP may transmit on based on the RF environment, bandwidth, frequency reuse, and other factors. At block 702, the WLC evaluates a PSC based on the RF neighborhood.

At block 704, the network controller determines whether a protocol associated with an AP support at least a minimum requirement. In one aspect, the minimum requirement may be a minimum standard version associated with a particular frequency band. For example, the network controller may determine whether the AP includes support for 802.11ax in the 6 GHZ band, which is also referred to as Wi-Fi 6E. Later versions of the standard, such as 802.11be will also be supported. Other examples may have different requirements, such as a different frequency, a different communication protocol, and so forth. If the network controller determines that the AP does not support the minimum requirement, the method 700 ends.

At block 706, if the network controller determines that at least one AP supports the minimum requirement, the network controller determines if a legacy fallback is enabled for the AP. For example, if the AP can fall back to older modes (e.g., 801.11n), the AP can use the legacy modes to communicate with wireless stations associated with the AP. If the AP does not need to fall back to legacy modes, the AP can enable PSC on all channels at block 708. In general, STAs attempt to prevent reselection and use history to guide selection. In this case, the STAs can identify the PSCs without scanning all frequencies. Generally, the STAs will scan a subset of frequencies based on previous connections to reduce connection delays. In some aspects, support for legacy modes is referred to as brownfield, and the omission of legacy devices is referred to as greenfield.

If a legacy fallback mode is enabled at block 706, the network controller determines whether the PSC information indicates a low RF density at block 710. In one aspect, a neighborhood density index (NDI) is computed based on a sum of all neighbor RSSI values divided by the number of neighbors. The NDI indicates received power per neighbor and may be in units of dBm/device. A low RF density indicates fewer potential opportunities for interference, and the STAs will select the PSC based on history. Based on a low RF density, the network controller may determine to enable PSC on all channels at block 708. When the PSC is enabled on all channels, the STAs may still perform the conventional PSC scan to identify APs using every fourth AP. However, if the STA has recently connected to a particular channel that is conventional not a PSC, the STA may attempt to connect to that channel without waiting.

If there is not low RF density at block 710, the network controller may determine whether there is high channel reuse at block 712. In some cases, channel reuse allows multiple devices to use the same channel by or time multiplexing is spacing devices apart in frequency. For example, if two STAs are proximate to each other but connected to different APs, spatial reuse is achieved by separating the frequency used by the STAs to prevent adjacent channel interference. The network controller can use the various techniques described above to determine a channel reuse factor. In this case, a rule-based approach such as a threshold with a hysteresis may classify channel reuse in low, medium, high, and so forth. In some cases, the network controller may combine connection metrics (e.g., retransmission rates, etc.) for the classification of channel reuse.

If the network controller determines that there is low channel reuse, the network controller enables PSC on all channels at block 708. On the other hand, if the network controller identifies medium-low channel reuse, the network controller determines whether the bandwidth for the channel is greater than 40 MHZ (e.g., 80 MHz or 160 MHz channels) at block 714. When the channel bandwidths are greater than 40 MHZ, the network controller may determine to add additional bias to PSC configuration at block 716. For example, the network controller may determine to increase the number of PSCs to 50%. In some aspects, additional bias indicates that additional channels are made available for PSC. The WLC may use an ML model to identify the additional channels based on conventional operation of the STAs during normal periods. If the network controller determines that the bandwidth for the channel is less than 80 MHZ, the network controller maintains PSC on default channels at block 718. In this case, because there is some frequency reuse and the bandwidths are limited, the default PSC configuration is maintained.

Referring back to block 712, if the network controller determines that there is high channel reuse with the AP, the network controller then determines whether the AP support collocated radio, for example, a 2.4 GHz radio that is also being used to provide network access. If the AP does not support the collocated radio, the network controller determines to maintain the default PSC configuration at block 718. If the AP supports the collocated radio, the network controller enables PSC on all channels at block 708.

Figure 8:
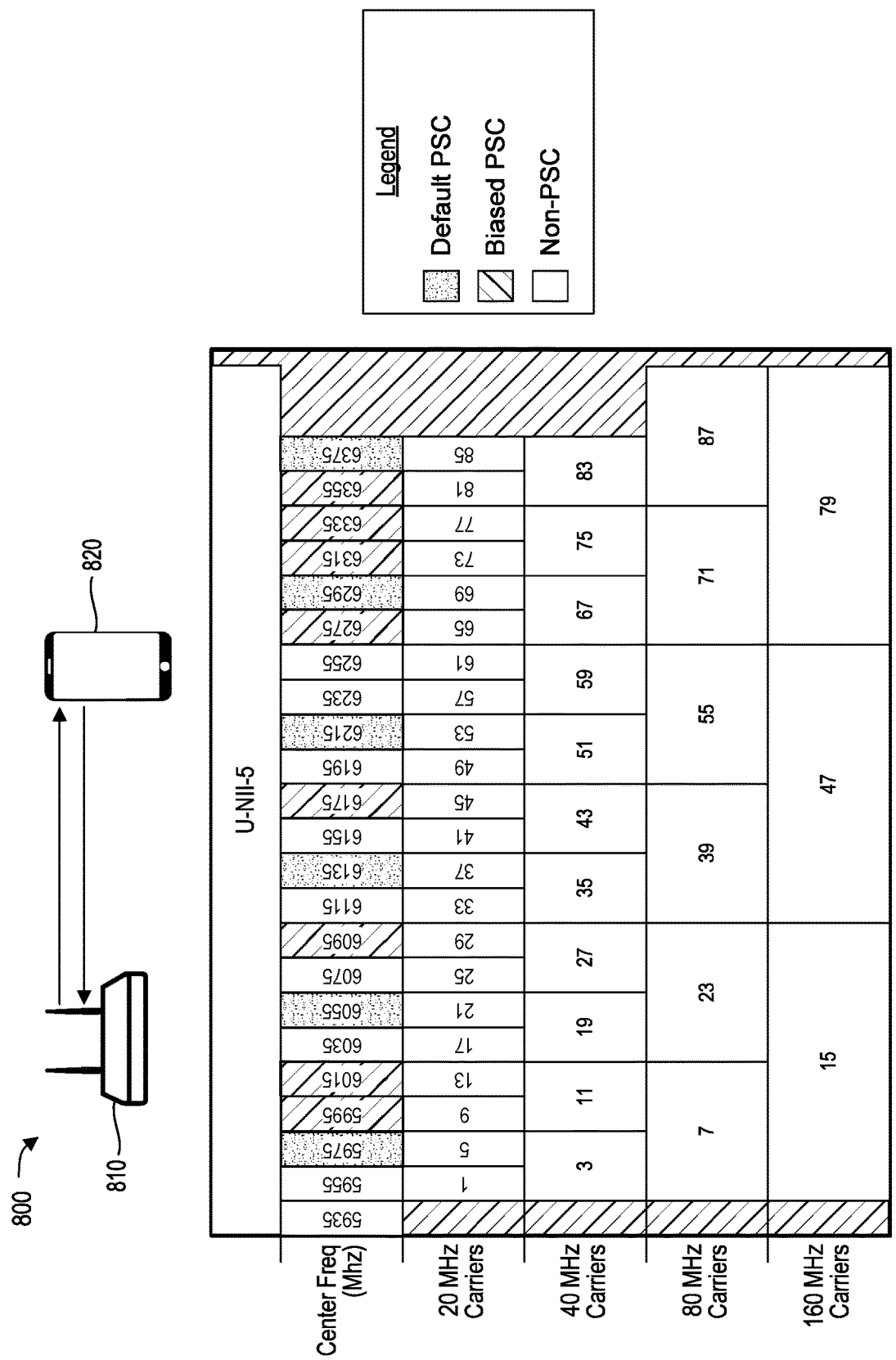
FIG. 8 is a conceptual diagram of a wireless LAN biased PSCs in the U-NII-5 frequency band, in accordance with some examples of the disclosure.

FIG. 8 is a conceptual diagram of a wireless LAN 800 transmitting PSCs in the U-NII-5 frequency band with bias, in accordance with some examples of the disclosure. A network controller configures the wireless LAN 800 to provide biased PSC on channels 9, 13, 29, 45, 65, 73, 77, and 81. An AP 810 is configured to transmit communication on a subset of channels using an RF radio (e.g., RFIC 420) based on the number of antennas. For example, the AP 810 is configured to communicate on 4 channels, the AP 810 is not limited to providing PSC on the default interleaved channels. In this case, the AP 810 may provide a PSC on channel 65 and when an STA 820 is forced to reselect based on received signal strength, the STA 820 may select a subset of adjacent channels and identify AP 810 without an exhaustive search. To this end, the AP 810 can reduce delay and increase frequency diversity. For example, if a particular sub-band in the 6 GHz band is not available, the number of PSCs is limited and frequency crowding can occur because conventional APs communication with at least one PSC.

Figure 9:
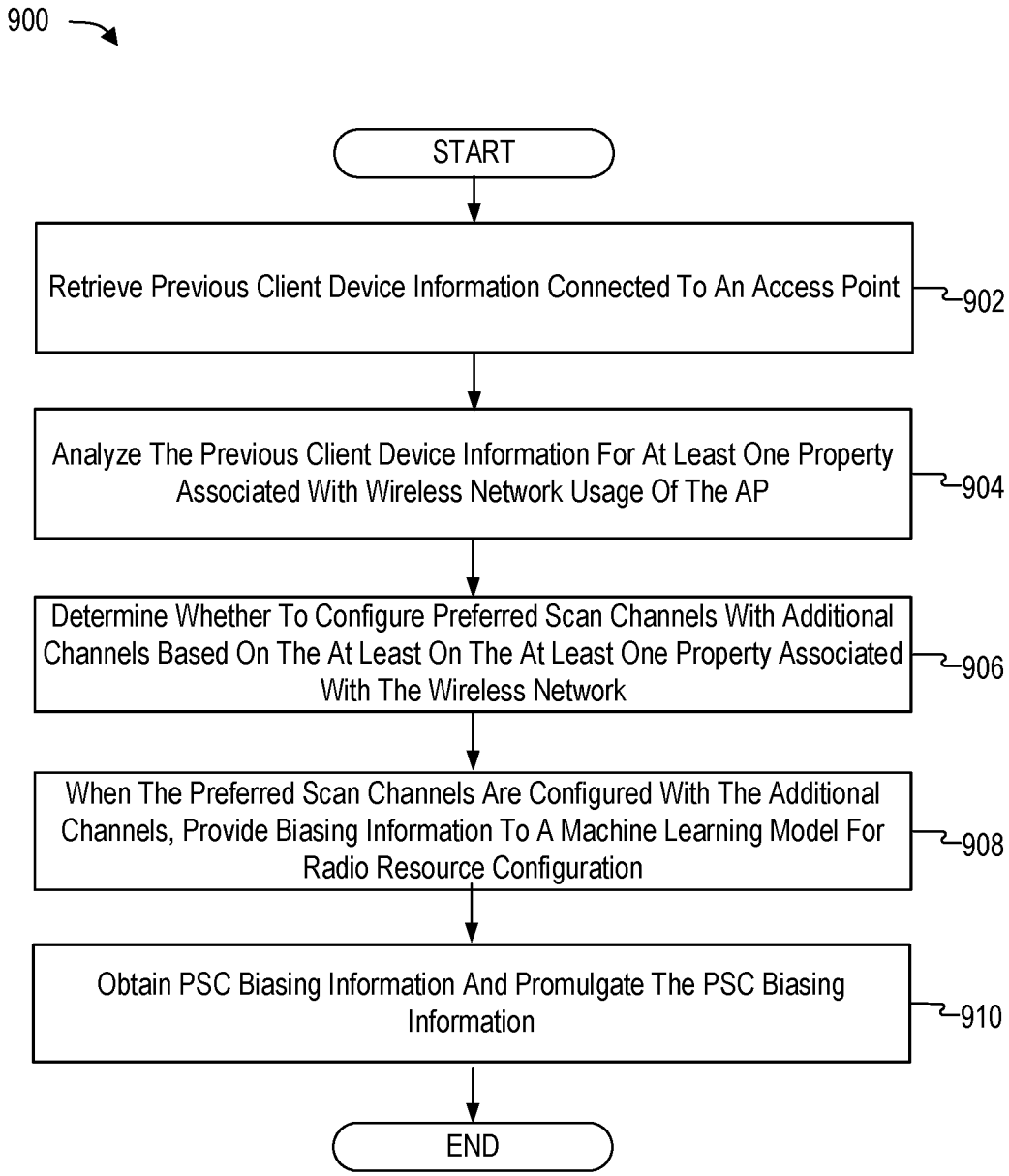
FIG. 9 illustrates an example method for adaptively biasing PSCs in accordance with some aspects of the disclosure.

FIG. 9 illustrates an example method 900 that can be performed for adaptive PSCs. Although the example method 900 depicts a particular sequence of operations, the sequence can be altered without departing from the scope of the present disclosure. For example, some of the operations depicted can be performed in parallel or in a different sequence that does not materially affect the function of the method 900. In other examples, different components of an example device or system that implements the method 900 can perform functions at substantially the same time or in a specific sequence. Although the network controller is described as performing the method, this example is for descriptive purposes. The method may be performed in a distributed manner using cloud computing, various containers, microservices, and other techniques.

At block 902, the network controller may retrieve previous client device information connected to at least one AP. For example, the network controller may retrieve usage logs that are stored on a daily, monthly basis, or retrieve previously stored and processed information related to network usage.

At block 904, the network controller may analyze the previous client device information for at least one property associated with wireless network usage of the at least one AP. For example, the network controller may identify quality related to retransmission, reconnection attempts, various exceptions, bandwidth consumption, jitter, various types of error rates, and so forth. In one illustrative example of block 904, the network controller may determine a network density associated with the at least one AP based on the previous client information. In this case, when the network density is determined to correspond to a sparse density, the preferred scan channels are configured with the additional channels. In one example, the network density is determined based on a sum of neighbor signal strengths associated with neighbor devices and divided by a quantity of the neighbor devices.

In one example of block 904, the analyzing the previous client device information may include determining whether the at least one AP can omit access by legacy client devices that transmit using a legacy wireless protocol based on the previous client information. For example, the network controller determines if each device that connects to the at least one AP supports at least 802.11ax in the 6 GHz frequency band. For example, an 802.11be STA supports 802.11ax standards. In the case all devices support the minimum requirement of 802.11ax in the 6 GHz and the AP can omit access by legacy devices, the preferred scan channels are configured with the additional channels. For example, the network controller may configure all channels for PSC.

In another example of block 904, the network controller may determine a channel reuse associated with the AP based on the previous client information. When the channel reuse is determined to correspond to low channel reuse, the preferred scan channels are configured with the additional channels. On the other hand, the network controller may determine whether the bandwidth of at least one channel is greater than a threshold. For example, the network controller determines if the bandwidth is 80 MHz or 160 MHz. In the event the bandwidth is greater than the threshold, the network controller is configured to add channels to the preferred scan channels.

In another example of block 904, the network controller may, based on the channel reuse, determine whether a collocated radio supports reduced neighbor report (RNR). In the event RNR is supported with a collocated radio, the preferred scan channels are configured with the additional channels.

At block 906, the network controller may determine whether to configure preferred scan channels with additional channels based on the at least one property associated with the wireless network.

At block 908, the network controller may, when the preferred scan channels are configured with the additional channels, provide biasing information to a machine learning model for radio resource configuration, wherein the machine learning model determines a set of channels to use as the preferred scanning channels.

At block 910, the network controller may obtain PSC biasing information and may promulgate the PSC biasing information to the various network components. For example, the network controller may instruct the AP to transmit PSC beacons on additional channels that are different than the predefined default configuration of every 4 channels.

In one non-limiting example, the network controller can configure an AP in the wireless network to transmit in non-PSC channels. Conventional APs transmit at least one channel on a PSC to allow discovery by STAs. In some cases, particularly in the case of a busy RF environment, an AP may be configured to transmit only on channels different from the default configured PSC channels (every 4 channels). For example, an AP can configure each antenna and transmission chain (e.g., amplifiers, mixers, etc.) to communicate on a non-standard PSC channel. Conventional APs cannot be discovered by STAs unless they transmit on a PSC channel. According to aspects of the disclosure, STAs may be configured to scan for non-PSC channels based on, for example, a previous connection and may be aware of non-standard PSC configuration.

Figure 10:
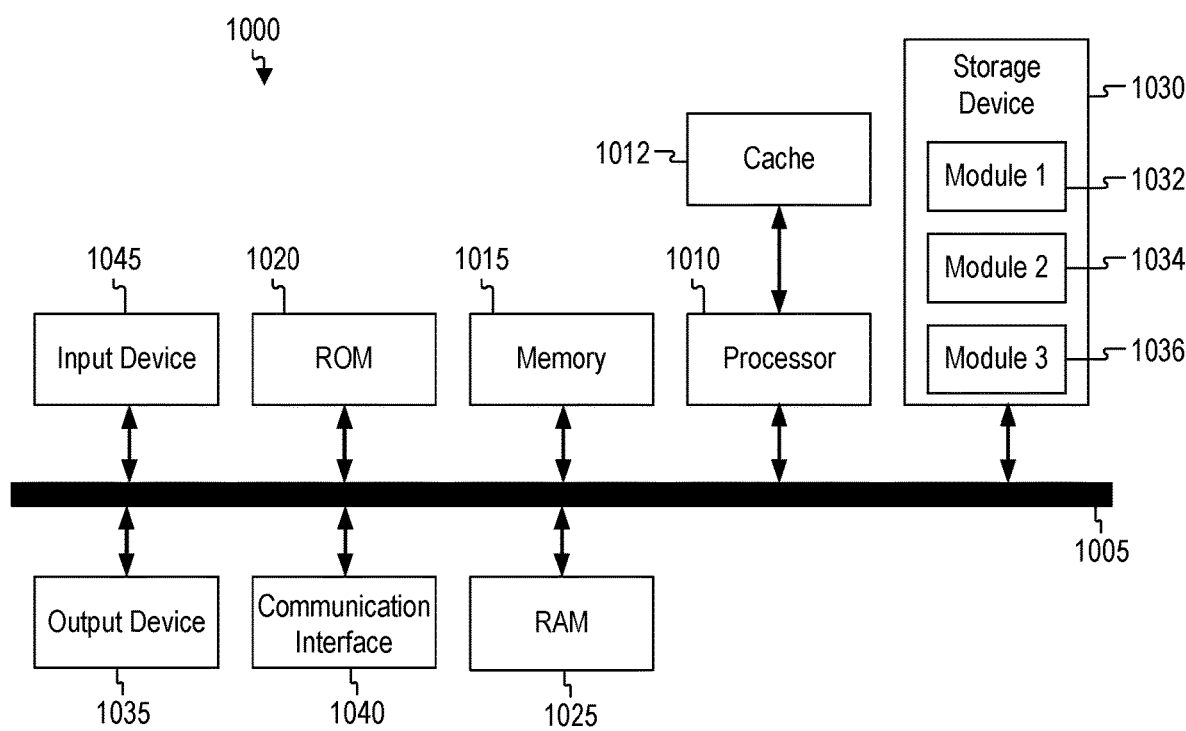
FIG. 10 shows an example of a computing system, which can be for example any computing device that can implement components of the system.

FIG. 10 shows an example of computing system 1000, which can be for example any computing device making up the various roles described above or any component thereof in which the components of the system are in communication with each other using connection 1005. Connection 1005 can be a physical connection via a bus, or a direct connection to processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 can essentially be a completely self-contained computing system, containing multiple cores or processors, a bus, memory controller, cache, etc. A multi-core processor can be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here can easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology can be presented as including individual functional blocks including functional blocks comprising devices, device components, steps or routines in a method embodied in software, or combinations of hardware and software.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

For clarity of explanation, in some instances, the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method for configuring preferred scan channels in a wireless network, comprising: retrieving previous client device information connected to at least one access point (AP); analyzing the previous client device information for at least one property associated with wireless network usage of the at least one AP; and determining whether to configure preferred scan channels with additional channels based on the at least one property associated with the wireless network.

Aspect 2. The method of Aspect 1, wherein analyzing the previous client device information for the at least one property associated with the wireless network usage comprises: determining whether the at least one AP can omit access by legacy client devices that transmit using a legacy wireless protocol based on the previous client information, wherein the preferred scan channels are configured with the additional channels when the AP can omit access by the legacy client devices.

Aspect 3. The method of any of Aspects 1 to 2, wherein analyzing the previous client device information for the at least one property associated with the wireless network usage comprises: determining a network density associated with the AP based on the previous client information, wherein, when the network density is determined to correspond to a sparse density, the preferred scan channels are configured with the additional channels.

Aspect 4. The method of any of Aspects 1 to 3, wherein the network density information is determined based on a sum of neighbor signal strengths associated with neighbor devices and divided by a quantity of the neighbor devices.

Aspect 5. The method of any of Aspects 1 to 4, wherein analyzing the previous client device information for the at least one property associated with the wireless network usage comprises: determining a channel reuse associated with the AP based on the previous client information.

Aspect 6. The method of any of Aspects 1 to 5, wherein, when the channel reuse is determined to correspond to low channel reuse, the preferred scan channels are configured with the additional channels.

Aspect 7. The method of any of Aspects 1 to 6, further comprising: based on the channel reuse, determining whether the bandwidth of at least one channel is greater than a threshold; and when the bandwidth is greater than the threshold, adding channels to the preferred scan channels.

Aspect 8. The method of any of Aspects 1 to 7, further comprising: based on the channel reuse, determining whether a collocated radio supports reduced neighbor report (RNR), wherein the preferred scan channels are configured with the additional channels when collocated radio is supported.

Aspect 9. The method of any of Aspects 1 to 8, further comprising: when the preferred scan channels are configured with the additional channels, providing biasing information to a machine learning model for radio resource configuration, wherein the machine learning model determines a set of channels to use as the preferred scanning channels.

Aspect 10. The method of any of Aspects 1 to 9, wherein each antenna and transmission chain of the at least one AP are configured to communicate on a non-standard PSC channel.

Aspect 11. An apparatus for configuring preferred scan channels in a wireless network includes a storage (implemented in circuitry) configured to store instructions and a processor. The processor configured to execute the instructions and cause the processor to: retrieve previous client device information connected to at least one access point (AP); analyze the previous client device information for at least one property associated with wireless network usage of the at least one AP; and determine whether to configure preferred scan channels with additional channels based on the at least one property associated with the wireless network.

Aspect 12. The apparatus of Aspect 11, wherein the processor is configured to execute the instructions and cause the processor to: determine whether the at least one AP can omit access by legacy client devices that transmit using a legacy wireless protocol based on the previous client information, wherein the preferred scan channels are configured with the additional channels when the AP can omit access by the legacy client devices.

Aspect 13. The apparatus of any of Aspects 11 to 12, wherein the processor is configured to execute the instructions and cause the processor to: determine a network density associated with the AP based on the previous client information, wherein, when the network density is determined to correspond to a sparse density, the preferred scan channels are configured with the additional channels.

Aspect 14. The apparatus of any of Aspects 11 to 13, wherein the network density information is determined based on a sum of neighbor signal strengths associated with neighbor devices and divided by a quantity of the neighbor devices.

Aspect 15. The apparatus of any of Aspects 11 to 14, wherein the processor is configured to execute the instructions and cause the processor to: determine a channel reuse associated with the AP based on the previous client information.

Aspect 16. The apparatus of any of Aspects 11 to 15, wherein the preferred scan channels are configured with the additional channels.

Aspect 17. The apparatus of any of Aspects 11 to 16, wherein based on the channel reuse, determining whether the bandwidth of at least one channel is greater than a threshold; and when the bandwidth is greater than the threshold, add channels to the preferred scan channels.

Aspect 18. The apparatus of any of Aspects 11 to 17, wherein based on the channel reuse, determine whether a collocated radio supports reduced neighbor report (RNR), wherein the preferred scan channels are configured with the additional channels when collocated radio is supported.

Aspect 19. The apparatus of any of Aspects 11 to 18, wherein the processor is configured to execute the instructions and cause the processor to: when the preferred scan channels are configured with the additional channels, provide biasing information to a machine learning model for radio resource configuration, wherein the machine learning model determines a set of channels to use as the preferred scanning channels.

Aspect 20. The apparatus of any of Aspects 11 to 19, wherein each antenna and transmission chain of the at least one AP are configured to communicate on a non-standard PSC channel.

Aspect 21. A non-transitory computer-readable medium comprising instructions which, when executed by one or more processors, cause the one or more processors to perform operations according to any of Aspects 1 to 10.

Aspect 22. An apparatus comprising means for performing operations according to any of Aspects 1 to 10.

What is claimed is:

1. A computer-implemented method for configuring preferred scan channels in a wireless network, comprising:
   retrieving, over a network, previous client device information connected to at least one access point (AP);
   analyzing the previous client device information for at least one property associated with wireless network usage of the at least one AP;
   determining whether to configure preferred scan channels with additional channels based on the at least one property associated with the wireless network; and
   in response to the determining, configuring the preferred scan channels with additional channels.

2. The method of claim 1, wherein analyzing the previous client device information for the at least one property associated with the wireless network usage comprises:
   determining whether the at least one AP can omit access by legacy client devices that transmit using a legacy wireless protocol based on the previous client information, wherein the preferred scan channels are configured with the additional channels when the AP can omit access by the legacy client devices.

3. The method of claim 1, wherein analyzing the previous client device information for the at least one property associated with the wireless network usage comprises:
   determining a network density associated with the AP based on the previous client information, wherein, when the network density is determined to correspond to a sparse density, the preferred scan channels are configured with the additional channels.

4. The method of claim 3, wherein the network density information is determined based on a sum of neighbor signal strengths associated with neighbor devices and divided by a quantity of the neighbor devices.

5. The method of claim 1, wherein analyzing the previous client device information for the at least one property associated with the wireless network usage comprises:
   determining a channel reuse associated with the AP based on the previous client information.

6. The method of claim 5, wherein, when the channel reuse is determined to correspond to low channel reuse, the preferred scan channels are configured with the additional channels.

7. The method of claim 5, further comprising:
   based on the channel reuse, determining whether a bandwidth of at least one channel is greater than a threshold; and
   when the bandwidth is greater than the threshold, adding channels to the preferred scan channels.

8. The method of claim 5, further comprising:
   based on the channel reuse, determining whether a collocated radio supports reduced neighbor report (RNR), wherein the preferred scan channels are configured with the additional channels when collocated radio is supported.

9. The method of claim 1, further comprising:
   when the preferred scan channels are configured with the additional channels, providing biasing information to a machine learning model for radio resource configuration, wherein the machine learning model determines a set of channels to use as the preferred scanning channels.

10. The method of claim 1, wherein each antenna and transmission chain of the at least one AP are configured to communicate on a non-standard PSC channel.

11. The method of claim 1, wherein the additional channels are used to by the at least one AP to transmit one or more beacons.

12. An apparatus for configuring preferred scan channels in a wireless network, comprising:
a storage configured to store instructions;
a processor configured to execute the instructions and cause the processor to:
retrieve, over a network, previous client device information connected to at least one access point (AP);
analyze the previous client device information for at least one property associated with wireless network usage of the at least one AP;
determine whether to configure preferred scan channels with additional channels based on the at least one property associated with the wireless network; and
in response to the determining, configure the preferred scan channels with additional channels.

13. The apparatus of claim 12, wherein the processor is configured to execute the instructions and cause the processor to:
determine whether the at least one AP can omit access by legacy client devices that transmit using a legacy wireless protocol based on the previous client information, wherein the preferred scan channels are configured with the additional channels when the AP can omit access by the legacy client devices.

14. The apparatus of claim 12, wherein the processor is configured to execute the instructions and cause the processor to:
determine a network density associated with the AP based on the previous client information, wherein, when the network density is determined to correspond to a sparse density, the preferred scan channels are configured with the additional channels.

15. The apparatus of claim 14, wherein the network density information is determined based on a sum of neighbor signal strengths associated with neighbor devices and divided by a quantity of the neighbor devices.

16. The apparatus of claim 12, wherein the processor is configured to execute the instructions and cause the processor to:
determine a channel reuse associated with the AP based on the previous client information.

17. The apparatus of claim 16, wherein the processor is configured to execute the instructions and cause the processor to:
based on the channel reuse, determining whether a bandwidth of at least one channel is greater than a threshold; and
when the bandwidth is greater than the threshold, add channels to the preferred scan channels.

18. The apparatus of claim 16, wherein
based on the channel reuse, determine whether a collocated radio supports reduced neighbor report (RNR), wherein the preferred scan channels are configured with the additional channels when collocated radio is supported.

19. The apparatus of claim 12, wherein the processor is configured to execute the instructions and cause the processor to:
when the preferred scan channels are configured with the additional channels, provide biasing information to a machine learning model for radio resource configuration, wherein the machine learning model determines a set of channels to use as the preferred scanning channels.

20. The apparatus of claim 12, wherein each antenna and transmission chain of the at least one AP are configured to communicate on a non-standard PSC channel.

* * * * *